E. P. WARNER & C. WILER.
GAS CHAMBER FOR ARC LAMPS.
APPLICATION FILED SEPT. 12, 1906.
929,354.
Patented July 27, 1909.
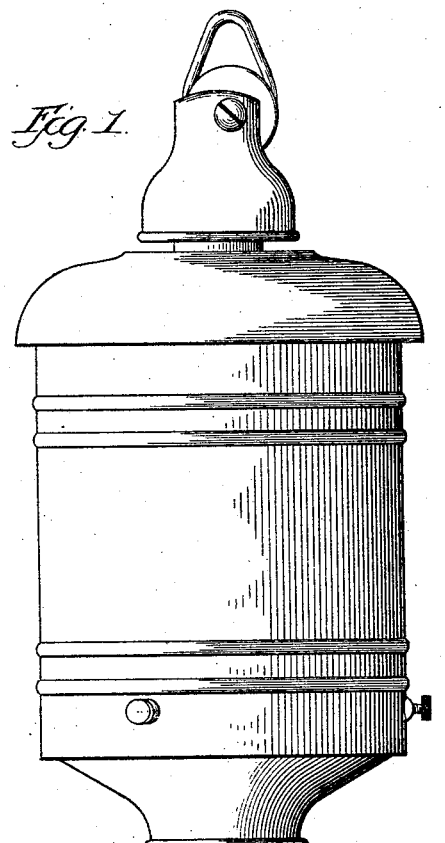
Fig. 1.
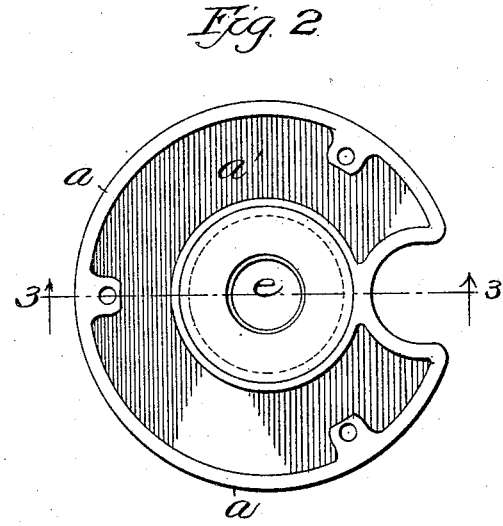
Fig. 2.
Fig. 3.
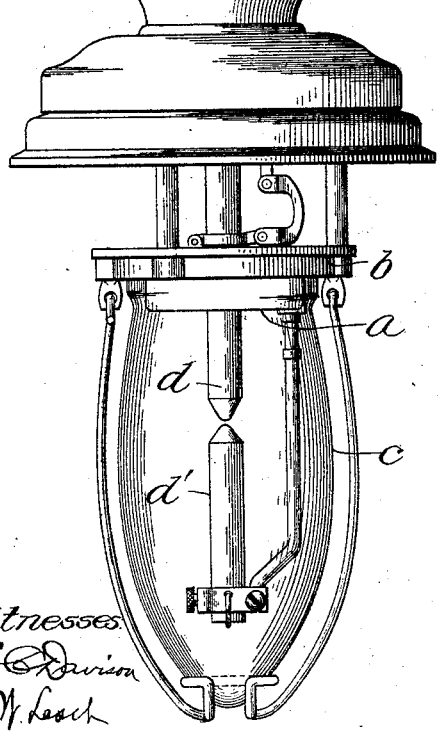
Witnesses
Inventors:
Ernest P. Warner,
Carl Wiler,
By Barton Tanner & Folk
Attys.

UNITED STATES PATENT OFFICE.

ERNEST P. WARNER AND CARL WILER, OF CHICAGO, ILLINOIS, ASSIGNORS TO WESTERN ELECTRIC COMPANY, OF CHICAGO, ILLINOIS, A CORPORATION OF ILLINOIS.

GAS-CHAMBER FOR ARC-LAMPS.

No. 929,354.      Specification of Letters Patent.      Patented July 27, 1909.

Application filed September 12, 1906. Serial No. 334,237.

*To all whom it may concern:*

Be it known that we, ERNEST P. WARNER and CARL WILER, citizens of the United States, residing at Chicago, in the county of Cook and State of Illinois, have invented a certain new and useful Improvement in Gas-Chambers for Arc-Lamps, of which the following is a full, clear, concise, and exact description.

Our invention relates to a gas cap especially adapted for use with electric arc lamps, and has for its object to provide an improved, simple, cheap and compact device for regulating the entry of air to the globe surrounding the arc to prevent at all times the free entry of air to the globe, and for mixing with the air reaching the globe the gases developed by the arc, in order to increase the life and efficiency of the carbons.

Our invention contemplates a gas cap in the mouth of an approximately air-tight globe surrounding the arc of the lamp, said cap comprising a pair of closed chambers—an outer and an inner chamber—provided with a common passageway through which one of the lamp carbons extends, and through which gases developed by the arc pass into narrow passageways leading to the said chambers and are accumulated therein under pressure, the gases in said chambers acting as a check to prevent the free entry of air into the chambers and globe.

In the operation of the lamp, when the arc is burning, the gases generated thereby flow into the chambers and are retained therein under pressure. As the arc continues to burn the excess of gas generated passes out of the globe through the common passageway surrounding the carbon, which passageway in practice is very small, and of course acts as a check to prevent the entrance of free air to the globe. A very limited amount of air is admitted to the globe, however, but not before it is thoroughly mixed with the gases. Now when the generation of gas becomes less, for instance, when the carbons are feeding, the pressure is reduced and the gases in the chambers flow therefrom through the narrow passageways and circulate around the carbon in the common passageway. Due to the narrow passageways forming restricted openings from the chambers to the common passageway, the speed of the flow of the gases therethrough is increased and the gases impinge on the carbon and consequently block up the common passageway around the carbon, thus creating in effect a gas collar around the carbon. It will be apparent, then, that the air cannot pass this collar, except in very limited quantities, and not without being first thoroughly mixed with the gases. It will thus be obvious that a very efficient gas check is produced, and that at all times during the operation of the lamp the admission of air to the globe is automatically regulated.

We will describe our invention by reference to the accompanying drawings, wherein—

Figure 1 is a view in elevation of an electric arc lamp equipped with a gas cap embodying our invention; Fig. 2 is a detail plan view of the gas cap; and Fig. 3 is a sectional view thereof on line 3—3 of Fig. 2.

The same letters of reference designate the same parts wherever shown.

The gas cap $a$ shown is secured to the check plate $b$ of the lamp at the mouth of the globe $c$ which surrounds the arc created by the carbons $d$ $d^1$ the upper carbon passing through the check plate $b$ and gas cap $a$. The gas cap comprises a main or outer chamber $a^1$ and an auxiliary or inner chamber $a^2$, said chambers being provided with a common annular passage $e$, through which the upper carbon passes. The floors of said chambers are separated and provided with annular openings therein forming said passageway. The upper carbon passes through a cover $f$ for the inner chamber $a^2$, said cover having an annular flange or collar $g$, through which the carbon $d$ passes, said flange terminating a short distance above the bottom floor of the chamber $a^2$, so as to leave a narrow annular passage way from said chamber into the passage through which the carbon $d$ passes. The check plate $b$ preferably forms a cover for the outer chamber. The space between said floors forms a narrow intermediate passage leading from the common passageway and opening into the main or outer chamber at all sides thereof. Thus the gases developed by the arc fill the chambers $a^1$ $a^2$ of the gas cap and serve as a check or cushion to prevent the entry of free air to the globe, but when the carbons are feeding and the amount of gas generated is lessened, the air is allowed to enter the chambers through the slight space between the upper carbon and the cover $f$ of the inner chamber, where it is mixed with the gases of the arc and admitted to the arc in a diluted form. In case either chamber should be destroyed by a short circuit or otherwise, the remaining chamber will be effective alone to regulate the admission of air to the globe, since the two chambers are independent of each other.

We claim:

1. A gas cap comprising two concentrically arranged cup-shaped members having alined openings in their bottoms, the one member inclosed within the other and spaced apart therefrom at the bottom and sides to form an inner and an outer chamber connected by an annular passageway, a cylindrical collar provided with an annular flange forming a cover for the inner chamber, and a check-plate forming a cover for said outer chamber, said check-plate and collar having openings in alinement with the said openings in the bottom of said cup-shaped members.

2. In a gas cap, the combination with an integral casting provided with an inner chamber and an outer chamber, of a flanged collar forming a cover for the inner chamber, and a check-plate forming a cover for the outer chamber, said check-plate and collar and the bottom walls of said chamber being provided with alined openings with which said inner chamber and said outer chamber communicate.

3. A gas cap for arc lamps comprising an outer and an inner chamber, and a collar forming part of the upper wall of said inner chamber, the lamp carbon passing through a common pasageway formed by said collar and openings in the floors of said chambers, the bottom of said collar and the floor of said inner chamber forming a narrow passageway connecting said inner chamber with the common passageway, said common passageway being connected with the outer chamber by a narrow passageway formed between the floors of said chambers and opening into said outer chamber at all sides thereof.

In witness whereof, we hereunto subscribe our names this 8th day of September A. D., 1906.

ERNEST P. WARNER.
CARL WILER.

Witnesses:
CLARENCE A. COGGIN,
ROY T. ALLOWAY.